United States Patent [19]

Iwatsuki et al.

[11] Patent Number: 4,894,538
[45] Date of Patent: Jan. 16, 1990

[54] SCANNING DEVICE FOR SCANNING TUNNELING MICROSCOPE

[75] Inventors: Masashi Iwatsuki; Kimio Ohi; Kazuma Suzuki; Kiyoshi Miyashita, all of Tokyo, Japan

[73] Assignee: Jeol Ltd., Tokyo, Japan

[21] Appl. No.: 173,066

[22] Filed: Mar. 25, 1988

[51] Int. Cl.$^4$ .............................................. H01J 37/26
[52] U.S. Cl. ..................................... 250/306; 250/307
[58] Field of Search ..................... 250/306, 307, 442.1, 250/423 F, 491.1; 310/317

[56] References Cited

U.S. PATENT DOCUMENTS

| | | | |
|---|---|---|---|
| 4,343,993 | 8/1982 | Binnig et al. | 250/306 |
| 4,523,120 | 6/1985 | Assard et al. | 310/317 |
| 4,668,865 | 5/1987 | Gimzewski et al. | 250/423 F |

OTHER PUBLICATIONS

"Scanning Tunneling Microscopy", G. Binnig and H. Rohrer, Surface Science 126 (1983) 236-244.

Primary Examiner—Jack I. Berman
Attorney, Agent, or Firm—Webb, Burden, Ziesenheim & Webb

[57] ABSTRACT

A tip-scanning mechanism for use in a scanning tunneling microscope uses three drivers for driving a probe tip in three perpendicular directions. The drivers each consist of a piezoelectric element. In accordance with the invention, these three drivers are each shaped into a sheet, and the three sheets are stacked on top of each other. Two of the three drivers produce strains parallel to both faces of the drivers when a voltage is applied across the faces of each driver. Thus, rapid scans can be made without producing distortion.

4 Claims, 2 Drawing Sheets

SCANNING DEVICE FOR SCANNING TUNNELING MICROSCOPE

FIELD OF THE INVENTION

The present invention relates to a scanning tunneling microscope and, more particularly, to a mechanism for scanning on a specimen with a probe tip.

BACKGROUND OF THE INVENTION

In scanning tunneling microscopy, a probe tip is brought close to a sample so that a space of approximately few nanometers (nm) may be left between them, in order that the electron cloud of the tip and the electron cloud on the sample surface be superimposed. Under this condition, a voltage is applied between the tip and the sample. The resulting current is called tunneling current. When the applied voltage is several mV to several V, the tunneling current is approximately 1 to 10 nanoAmperes (nA). The magnitude of the tunneling current is proportional to the distance between the sample and the tip. Thus, this distance can be determined quite accurately by measuring the magnitude of the tunneling current. If the position of the tip is known, the shape of the sample surface can be determined. If the position of the tip is so controlled that the tunneling current is kept constant, then the geometry of the sample surface can be similarly determined by tracing the position of the tip. The principle of the scanning tunneling microscopy is explained in U.S. Pat. No. 4,343,993.

In scanning tunneling microscopy where a specimen, for example an integrated circuit chip, is scanned, the tip placed along the z-axis is moved along both x- and y-axes to make a two-dimensional scan of a sample whose flat surface is placed in the xy-plane. Heretofore, the cubic type and the tube type of tip have been available as the chip scanner.

FIG. 1(a) is a perspective view of a chip scanning device of the cubic type. FIG. 1(b) is a side elevation of the device. Piezoelectric devices 1x and 1y are used for scans made along the x- and y-axes, respectively. A piezoelectric element 2 is employed to control the position of the front end of a probe tip 3 along the z-axis. In the operation of the scanning device of the cubic type, a voltage is applied between both ends of each piezoelectric element to produce an electric field. The piezoelectric element is then polarized and distorted to make scans along the x- and y-axes. When a scan is made along the x-axis, the piezoelectric element 1x is distorted as indicated by the broken line in FIG. 1(b). A large stress is applied to the yz-plane. As a result, cracks may take place. For this reason, it has been impossible for the device of the cubic type to make a scan over a relatively broad range. When the piezoelectric element used for the scan made along the x-axis is stretched or contracted, the position of the chip taken on the y-axis is also varied. Therefore, the scan of the chip involves distortion.

FIG. 2(a) is a perspective view of a scanning device of the tube type. FIG. 2(b) is a side elevation of the device. Referring to FIG. 2(a), piezoelectric elements 4x', and 4x are used for coarse movement and fine movement, respectively, made along the x-axis. Piezoelectric elements 4y', and 4y are employed for coarse movement and fine movement, respectively, made along the y-axis. A piezoelectric element 5 is used for controlling the position taken on the z-axis. The element 5 is bonded to the elements 4x, 4x', 4y, and 4y'. A probe tip 6 is mounted on the element 5. In the operation of the scanning device of the tube type, the piezoelectric element 4x', is distorted by elongation, while the piezoelectric element 4x is distorted by contraction, for example. Then, as shown in FIG. 2(b), the tip 6 is scanned along the x-axis. With this device, it has been impossible to scan the sample at a high speed, because flexure of the elements is utilized.

SUMMARY OF THE INVENTION

It is an object of the invention to provide a scanning tunneling microscope equipped with a scanning device capable of making scans over a wide range without producing distortion.

It is another object of the invention to provide a scanning tunneling microscope capable of making rapid scans.

It is a further object of the invention to provide a scanning tunneling microscope equipped with a scanning device which is small enough to be incorporated in the sample-positioning mechanism of the transmission electron microscope.

These objects are achieved in accordance with the teachings of the invention by a chip-scanning device for use in a scanning tunneling microscope, said scanning device comprising first and second drivers which use piezoelectric or electrostrictive elements to move a chip or a sample along x- and y-axes parallel to the sample surface, each of the drivers consisting of a sheet, the drivers being stacked on top of each other, the scanning device being further provided with power supplies for scans made along the x- and y-axes, respectively, the power supplies causing the first and second elements to produce electric fields in the direction of the stack, the first and second elements acting to produce strains vertical to the electric fields by the shear mode of the direct piezoelectric effect, whereby the position of the tip is shifted along the x- and y-axes.

DESCRIPTION OF THE PREFERRED EMBODIMENT

Figure 1A:
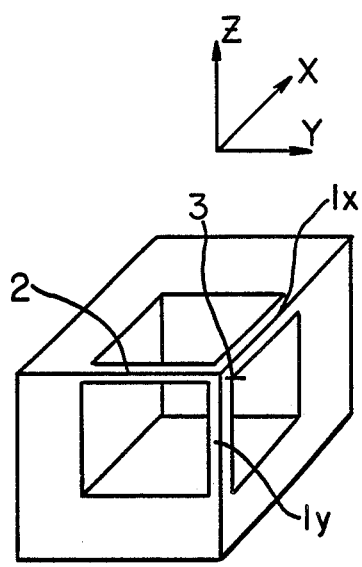
FIG. 1(a) is a perspective view of a conventional scanning device of the cubic type.
Figure 1B:
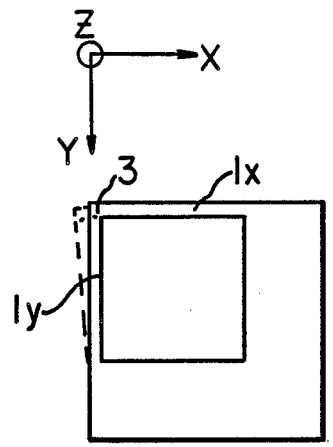
FIG. 1(b) is a side elevation of the scanning device shown in FIG. 1(a)
Figure 2A:
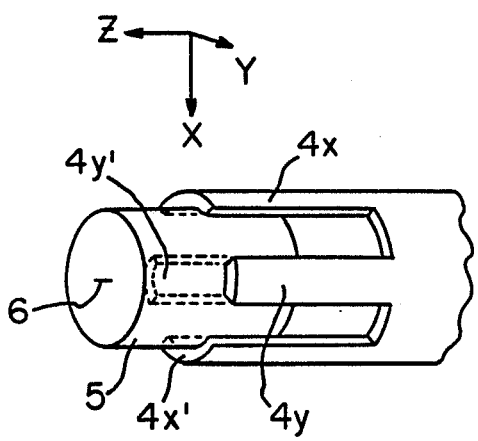
FIG. 2(a) is a perspective view of a conventional scanning device of the tube type.
Figure 2B:
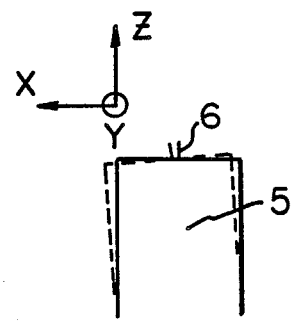
FIG. 2(b) is a side elevation of the device shown in FIG. 2(a)
Figure 3:
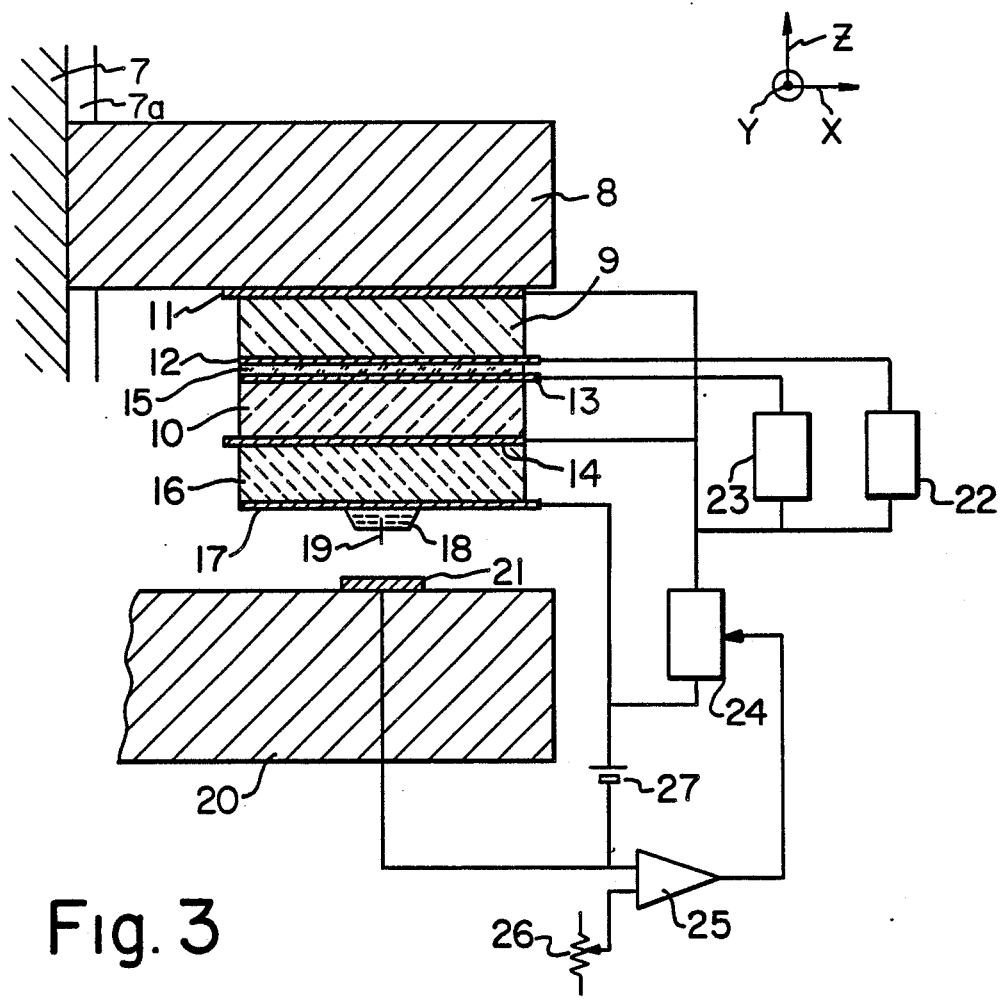
FIG. 3 is a schematic diagram of a scanning device according to the invention.
Figure 4A:
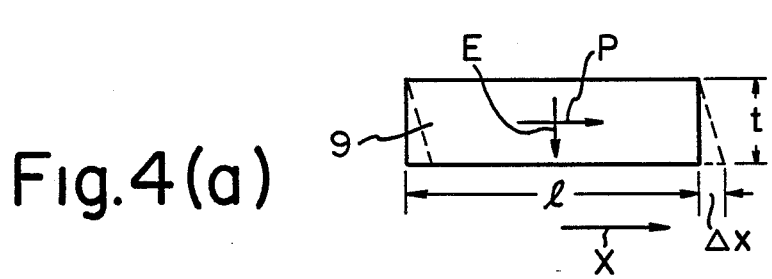
FIGS. 4(a) and 4(b) are side elevations of piezoelectric elements used in the device shown in FIG. 3, for illustrating the directions in which strains are produced.

Referring to FIG. 3, there is shown a scanning device according to the invention. This device has a first driver 9 and a second driver 10 which are used to make scans along the x- and y-axes, respectively. The drivers 9 and 10, each of which takes the form of a sheet, are stacked on top of each other. Electrode plates 11 and 12 are disposed in such a way that the driver 9 is sandwiched between them. Also, electrode plates 13 and 14 are disposed such that the driver 10 is held between them. When a voltage is applied between the electrode plates 11 and 12 from a power supply (described later), an electric field E is produced inside the first driver 9 vertical to the surface of the driver, as shown in FIG. 4(a). Similarly, an electric field is set up inside the second driver 10 vertical to the surface.

An electrically insulating member 15 is mounted between the electrode plates 12 and 13. A third driver 16 is used to drive a probe tip 19 (described later) along the z-axis, and is sandwiched between the electrode plate 14 and another electrode plate 17. A voltage is applied between the electrode plates 14 and 17. The electrode plates 11, 12, 13, 14, 17 are bonded to their adjacent piezoelectric elements with epoxy resin adhesive. The electrode plate 11 is bonded to a support member 8 also with epoxy resin adhesive, the support member being made of an electrically insulating material. The support member 8 is mounted so as to be movable along a guide groove 7a formed in a pole 7. The position of the support member 8 taken on the z-axis can be coarsely adjusted. The electrode plates 12 and 13 are bonded to the insulating member 15 also with epoxy resin adhesive.

A tip holder 18 is rigidly fixed to the electrode plate 17. The tip 19 is mounted to the holder 18. Each of the drivers can be formed by shaping PZT (lead zirconate titanate) that is a typical piezoelectric ceramic into a sheet or by laminating sheets of PZT. The drivers 9 and 10 are designed to produce strains vertical to the aforementioned electric fields by the shear mode of the direct piezoelectric effect. On the other hand, the driver 16 produces a strain parallel to the applied electric field.

A sample 21 is placed on a sample support member 20 made of an electrically insulating material. The bias voltage supply 27 applies the voltage (several mV to several V) between the tip 16 and the sample 21 to produce the tunneling current. Power supplies 22 and 23 generate voltages used for scans made along the x- and y-axes, respectively. Another power supply 24 is employed to control the position of the tip 19 taken on the z-axis. The tunneling current flowing through the sample 21 is fed to one input end of a differential amplifier 25. A reference signal generator 26 is connected to the other input of the amplifier 25. The error (differential) signal from the amplifier 25 is supplied to the power supply 24 to constitute a feedback control system which maintains the tunneling current at a reference value.

In the operation of the device constructed as described above, the power supply 22 for a scan made along the x-axis applies a voltage between the electrode plates 11 and 12. Thus, a voltage is applied across the driver 9 to produce the electric field E as shown in FIG. 4(a). At this time, an electrical polarization is set up in the direction indicated by the arrow P. As a result, the driver 9 is distorted in a direction perpendicular to the field E as indicated by the broken lines by the shear mode of the direct piezoelectric effect.

As shown in FIG. 4(a), the thickness and the width of the driver 9 are indicated by t and l, respectively. The applied voltage is denoted by V. Since the magnitude of the direct piezoelectric effect in the shear mode is expressed by piezoelectric strain constant $d_{15}$, the incremental stress $\Delta x$ caused by the polarization is given by
$$\Delta x = d_{15} \cdot V \cdot t.$$

Figure 4B:

Therefore, the strain of the driver 9 as measured along the x-axis can be increased at a constant rate by changing the voltage V linearly with time. Likewise, the driver 10 can be distorted along the y-axis by applying a scanning voltage from the power supply 23. The displacement of the front end of the tip 19 parallel to the sample surface is the superimposition of the displacement caused by the driver 9 along the x-axis and the displacement brought about by the driver 10 along the y-axis. Consequently, the chip 19 can be scanned along the x- and y-axes in a parallel relation to the sample surface. The power supply 24 applies a voltage across the driver 16 according to the differential signal from the amplifier 25 to distort the driver 16 parallel to the electric field E' as shown in FIG. 4(b). In this way, the distance between the tip 16 and the sample surface can be accurately controlled.

In this device, if the drivers 9 and 10 are distorted, they do not apply stresses to each other, nor do they interfere with each other. Therefore, even if large displacements are caused, no cracks occur unlike the prior art device. Also, the scan made along the x-axis does not affect the scan made along the y-axis and so the images obtained by the scanning tunneling microscope will not be distorted. Another advantage arises from the fact that deflection of piezoelectric elements is not utilized unlike the tube-type device. Consequently, the elements can be driven at TV rate (about 17KHz). This makes it possible to scan the chip at a high speed.

It is to be understood that the foregoing relates to only a preferred embodiment of the invention and that various changes and modifications may be made without departing from the spirit of the invention. In the above example, each driver consists of a piezoelectric element made of PZT. The driver may be made of other material which exhibits larger direct piezoelectric effect only in the shear mode. Further, an electrostrictive element showing a smaller critical electric field than the piezoelectric element may be used instead of the piezoelectric element. Such an electrostrictive element can consist of PLZT (lead lanthanum zirconate titanate), for example.

Also in the above example, the invention is applied to a scanning tunneling microscope in which the chip is moved along the z-axis. The invention is also applicable to a tip-scanning device for a scanning tunneling microscope in which the tip is moved along the x- and y-axes, while the sample is moved along the z-axis. Furthermore, a driver for controlling the position taken on the z-axis may be sandwiched between first and second drivers which are stacked on top of each other.

Having thus described our invention with the detail and particularity required by the Patent Laws, what is claimed and desired to be protected by Letters Patent is set forth in the following claims.

What is claimed is:

1. In a scanning tunneling microscope having a scanning device and a probe tip whose front end is located close to a sample surface that is maintained in the xy-plane of a rectangular coordinate system consisting of x-, y-, and z-axes, the front end of the tip being maintained parallel to the z-axis, the scanning device causing the tip to make two-dimensional scans of the sample surface while a voltage is applied between the sample and the tip to produce a tunneling current between them, the microscope acting to obtain information about the sample surface from the tunneling current, the scanning device comprising two drivers, which, when a voltage is applied to them, expand or contract along the x- and y-axes, respectively, and each of which consists of a piezoelectric or electrostrictive element, the improvement wherein the two drivers are stacked on top of each other and each shaped into a sheet, and wherein, when a voltage is applied across each driver, a strain is produced parallel to the surface of the driver.

2. In a scanning tunneling microscope having a scanning device and a probe tip whose front end is located close to a sample surface that is maintained in the xy-plane of a rectangular coordinate system consisting of x-, y-, and z-axes, the front end of the tip being maintained parallel to the z-axis, the scanning device causing the tip to make two-dimensional scans of the sample surface while a voltage is applied between the sample and the tip to produce a tunneling current between them, the microscope acting to obtain information about the sample surface from the tunneling current, the scanning device acting to vary the distance between the sample and the tip as well as to make the two-dimensional scans, the scanning device comprising three drivers which, when a voltage is applied to them, expand or contract along the x-, y-, and z-axes, respectively, and each of which consists of a piezoelectric or electrostrictive element, the improvement wherein
 (A) the three drivers are stacked on top of each other and each shaped into a sheet,
 (B) the two drivers which make scans along the x- and y-axes produce strains parallel to the end surfaces of the drivers when a voltage is applied between the end surfaces of each driver, and
 (C) the driver which is displaced along the z-axis produces a strain vertical to the surfaces of the driver when a voltage is applied between the surfaces.

3. In a scanning tunneling microscope as set forth in claims 1 or 2, the further improvement wherein each of said drivers consists of PZT.

4. In a scanning tunneling microscope as set forth in claim 2, the further improvement wherein the driver which is displaced along the z-axis is sandwiched between the two drivers making scans along the x- and y-axes.

* * * * *

UNITED STATES PATENT AND TRADEMARK OFFICE
CERTIFICATE OF CORRECTION

PATENT NO. : 4,894,538

DATED : January 16, 1990

INVENTOR(S) : Masashi Iwatsuki, Kimio Ohi, Kazuma Suzuki and Kiyoshi Miyashita

It is certified that error appears in the above-identified patent and that said Letters Patent is hereby corrected as shown below:

On the title page;

After the filing date information insert
--Foreign Application Priority Data
Mar. 27, 1987 [JP] Japan ... 62-73757--.

Signed and Sealed this

Fourth Day of December, 1990

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,894,538

DATED : January 16, 1990

INVENTOR(S) : Masashi Iwatsuki, Kimio Ohi, Kazuma Suzuki and Kiyoshi Miyashita

It is certified that error appears in the above-identified patent and that said Letters Patent is hereby corrected as shown below:

Title page:

After "Assignee: Jeol Ltd., Tokyo, Japan" insert
--and Rion Co., Ltd., Tokyo, Japan--.

Signed and Sealed this

Second Day of April, 1991

Attest:

HARRY F. MANBECK, JR.

*Attesting Officer*  *Commissioner of Patents and Trademarks*